Feb. 21, 1967  C. C. GAMBILL  3,305,766
FULL WAVE VOLTAGE CONTROL SYSTEMS FOR HEATING LOADS
Filed April 29, 1963  3 Sheets-Sheet 1
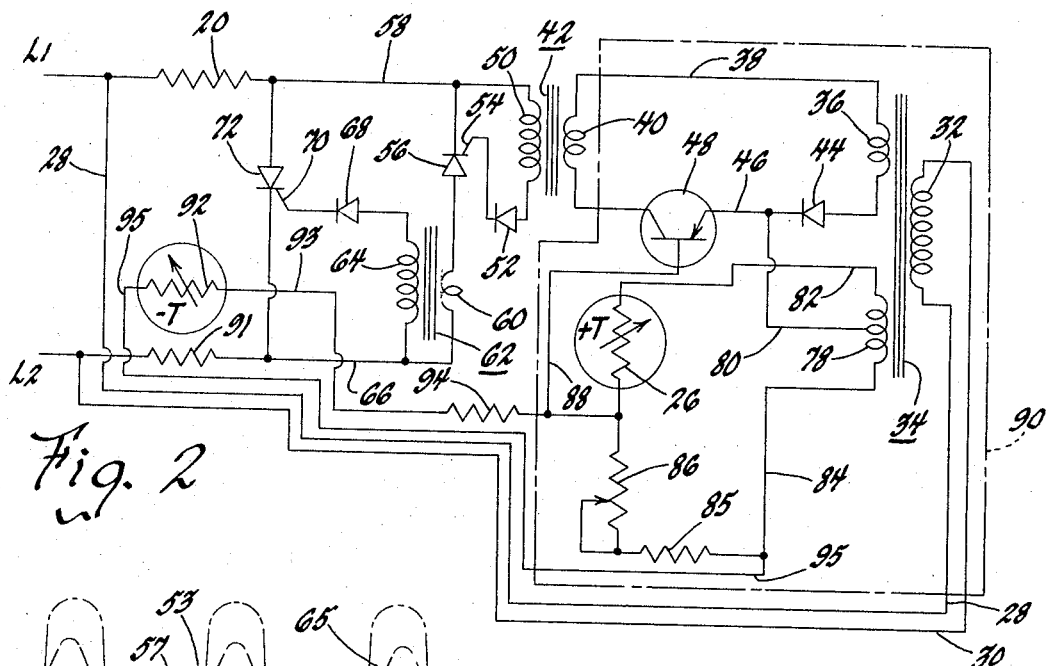
Fig. 2
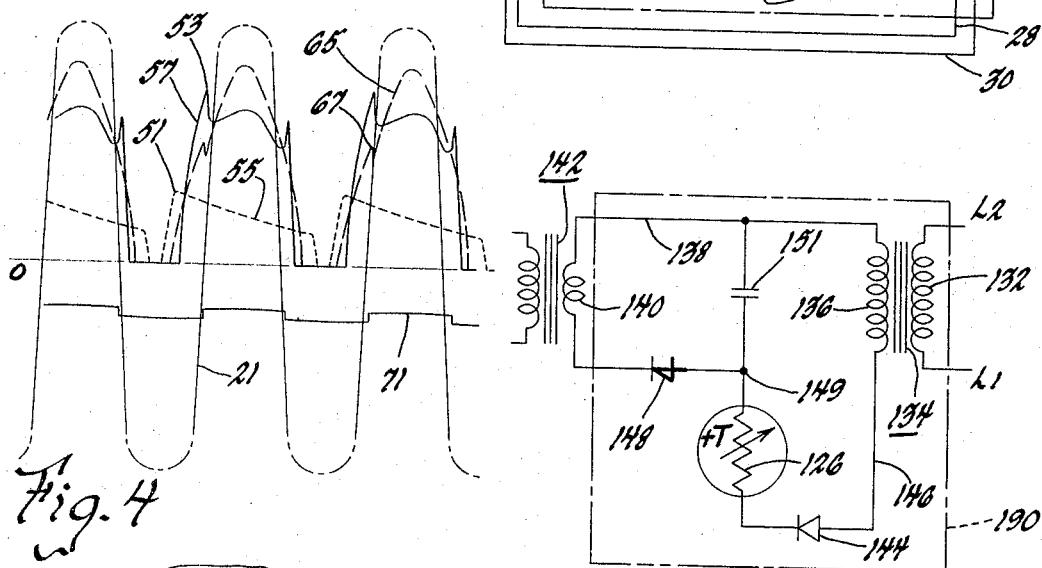
Fig. 4
Fig. 3
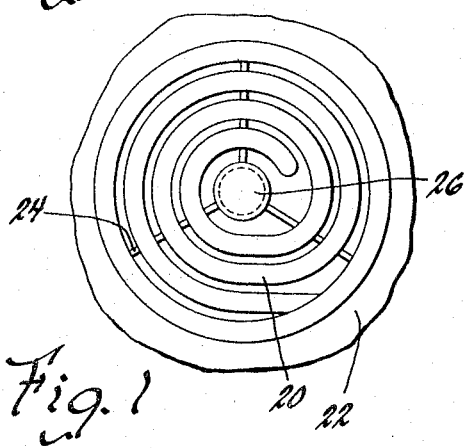
Fig. 1
INVENTOR.
Charles C. Gambill
BY
Carl A. Stickel
HIS ATTORNEY INVENTOR.
Charles C. Gambill
BY
Carl A Stickel
HIS ATTORNEY

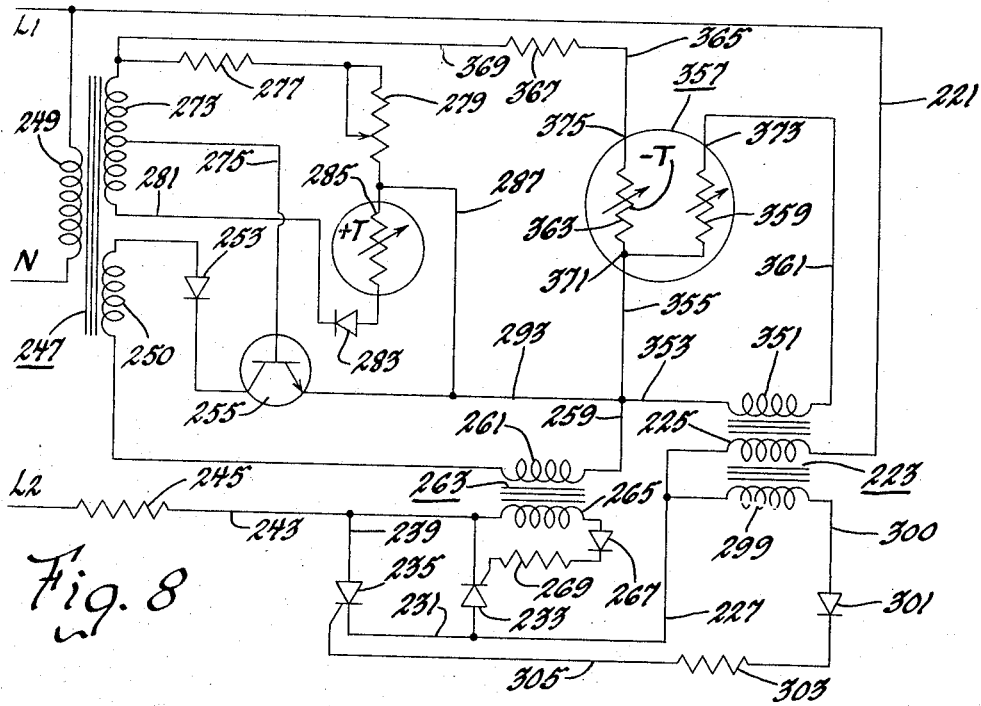

United States Patent Office 3,305,766
Patented Feb. 21, 1967

3,305,766
FULL WAVE VOLTAGE CONTROL SYSTEMS FOR HEATING LOADS
Charles C. Gambill, Tipp City, Ohio, assignor to General Motors Corporation, Detroit, Mich., a corporation of Delaware
Filed Apr. 29, 1963, Ser. No. 276,519
5 Claims. (Cl. 323—22)

This invention pertains to electrical apparatus and more particularly to means for controlling an electrical load with a minimum of radio interference.

It has been proposed to control semiconductor control devices in alternating current, phase control circuits by varying the phase angle at which the peak voltage is applied so that the devices conduct for varying portions of half cycles. I have found that such circuits cause objectionable radio interference and therefore may not be used in many localities.

It is an object of my invention to provide suitable, simple, alternating current, electrical semiconductor, full-wave control systems for an electrical load which is reliable, accurate, inexpensive and free of radio interference.

It is another object of my invention to provide a suitable, simple, alternating current, electrical, semiconductor, multiple layer diode, full-wave control system for an electrical load which controls by either conducting or failing to conduct for one or more substantially complete, consecutive, alternate half cycles.

It is another object of my invention to provide suitable, simple, alternating current, electrical semiconductor, multiple layer diode, full-wave control systems for an electrical load which applies one peak voltage triggering signal at a time to a master semiconductor substantially at the time the voltage applied to it passes through zero and, as a result of this, conduction also applies a voltage triggering signal sufficient to cause conduction to a slave semiconductor at the beginning of the following half cycle.

It is also an object of my invention to control such a peak voltage triggering signal and the master and slave semiconductors by varying the amplification of the peak voltage to control the conduction.

These and other objects are obtained in the forms shown in the drawings in which, through a step-down, step-up transformer and rectifier arrangement, a peak voltage is applied to the master silicon-controlled rectifier substantially at the beginning of an alternating current, half cycle in the proper direction. The conduction through the master rectifier through the excitation of a transformer arrangement and rectifier induces a voltage applied substantially a half cycle later to the gate of the slave silicon-controlled rectifier effective to conduct in the opposite direction. The master and slave silicon-controlled rectifiers are placed inversely relative to each other in series with the load which may be an electric heater to apply full-wave power.

Further objects and advantages of the present invention will be apparent from the following description, reference being had to the accompanying drawings wherein preferred embodiments of the present invention are clearly shown.

In the drawings:

FIGURE 1 is a top view of the surface heater of an electric range embodying one form of my invention;

FIGURE 2 is a wiring diagram illustrating one form of my invention;

FIGURE 3 is a wiring diagram illustrating an alternative trigger circuit which may be used in the place of the trigger circuit of FIGURE 2;

FIGURE 4 is a voltage-time diagram illustrating the input and gate voltage curves;

FIGURE 8 is a modified wiring diagram somewhat similar to FIGURE 5 arranged so that the third winding of the transformer is connected to the second circuit portion of a dual thermistor serving as an anticipator; and FIGURE 9 is a modified wiring diagram similar to FIGURE 8 excepting that the primary winding of the three winding transformer is connected in parallel with the load.

Figure 5:
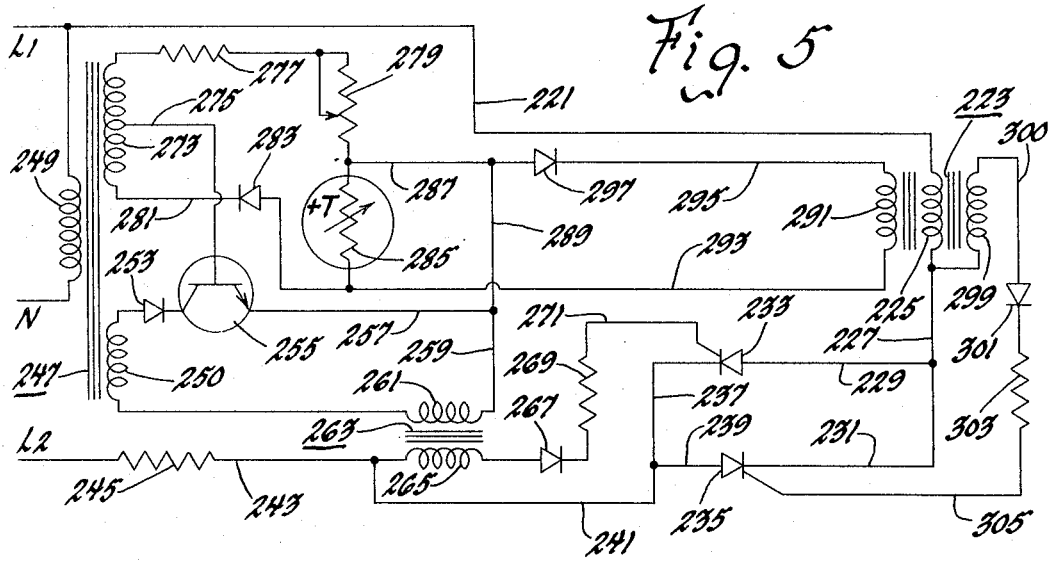
FIGURE 5 is a modified wiring diagram in which one winding of a three-winding transformer is connected in series with a load and has another winding connected to the terminal of the sensing temperature responsive resistance and a third winding connected to the gate of the slave silicon-controlled rectifier.

Referring now more particularly to FIGURE 1, there is shown the surface heater 20 of an electric range 22 provided with a three-armed support 24 which supports, in addition to the sheathed heater 20, a spring mounted contact or device adapted to contact the bottom of a pan or utensil resting upon the surface heater 20 and containing a temperature responsive resistance 26. In the control system for the heater 20 shown in FIGURE 2, the conductors 28 and 30 connect the alternating current supply conductors $L_1$ and $L_2$ to the opposite terminals of the primary winding 32 of a step-down transformer 34. For a 115-volt supply source, this transformer may be a Staco 9407 transformer manufactured by the Standard Electrical Products Co. of Dayton, Ohio, having a 115-volt primary winding and two secondary windings of 6 volts and 9 volts. For example, the transformer 34 may have a 6-volt secondary winding 36 having one of its terminals connected through the conductor 38 to one of the terminals of the primary winding 40 of a step-up transformer 42 which may also be a Staco 9407 type but arranged to have only one primary and one secondary winding.

The other terminal of the secondary winding 36 is connected through a diode rectifier 44 and a conductor 46 to the emitter of a PNP germanium transistor 48. The collector of this transistor 48 is connected to the second terminal of the primary winding 40. The transformer 42 has its secondary winding 50 connected through a diode 52 to the gate 54 of a silicon-controlled rectifier 56. The second terminal of the secondary winding 50 and the cathode power electrode of the rectifier 56 are connected by the conductor 58 to one terminal of the heater 20 which has its other terminal connected to the alternating current supply conductor $L_1$. The step-down, step-up transformer and rectifier arrangement of the transformers 34 and 42 and the rectifier 44 applies a peak voltage to the gate 54 of the controlled rectifier 56 substantially at the beginning of the half-wave cycle which is oriented to pass through the rectifier 56. This peak voltage applied to the gate 54 when the current flow through the transistor 48 is insufficient to cause firing of the master silicon-controlled rectifier 56 is represented by a voltage curve 55 illustrated in a dotted line in FIGURE 4. When the voltage applied to the gate 54 becomes sufficiently high to cause the controlled rectifier 56 to fire, there results a voltage curve 57 as is illustrated in a full line in FIGURE 4. In each of the curves 55 and 57, the peak voltage 51 or 53 occurs at the beginning of each cycle and is less for the remainder of that wave. The peak voltage 51 of the curve 55 is insufficient to cause firing of the rectifier 56 but the peak voltage 53 of the curve 57 is sufficient to cause firing of the silicon-controlled rectifier 56. The occurrence of the peak voltage 53 substantially at the beginning of each cycle assures that the silicon-controlled rectifier 56 will either conduct or not conduct for each full half cycle and effectively prevents the beginning of conduction at a later point in the cycle thereby minimizing radio interference.

Connected to the anode power electrode of the controlled rectifier 56 is a primary winding 60 of a step-up transformer 62, such as a Thordarson 21F00 transformer. The winding 60 has preferably only about four turns and a resistance of $\frac{1}{1000}$ of an ohm. The secondary winding 64 of the transformer 62 preferably has about 3450 turns and a resistance of about 450 ohms. The lower terminals of each of the windings 60 and 64 are connected through the conductor 66 connecting through an anticipating heater 91 with the supply conductor $L_2$. The upper terminal of the secondary winding 64 is connected through a diode rectifier 68 to the gate 70 of the slave silicon-controlled rectifier 72. Both the silicon-controlled rectifiers 56 and 72 may be of the type C37D manufactured by the General Electric Company. Preferably, however, silicon-controlled rectifiers of the following specifications are used:

Minimum forward breakover voltage (V.B.O.) volts__ 400
Minimum peak inverse voltage (P.I.V.) ____do____ 450
R.M.S. forward current (with 85° C. stud temperature) _____amperes__ 6
Maximum gate voltage to fire at 25° C. ____volts__ 3
Maximum gate current to fire at 25° C. milliamperes__ 25

To control the conduction of the transistor 48, the transformer 34 is provided with a second secondary transformer winding 78 provided with a center tap connected by the conductor 80 to the conductor 46 which connects to the emitter of the transistor 48. The upper terminal on the diagram of the secondary winding 78 is connected by the conductor 82 to the upper terminal of the temperature responsive resistance 26. This temperature responsive resistance 26 may be of the positive temperature coefficient type manufactured by the King Seeley Corporation of Ann Arbor, Michigan, and having approximately 10 ohms resistance at 77° F. The lower terminal on the diagram of the secondary winding 78 is connected by the conductor 84 and the current limiting resistance 85 to one terminal of the adjustable potentiometer 86. This potentiometer 86 preferably has a maximum resistance of 15 ohms and preferably is calibrated in temperatures which are coordinated with the temperature control provided by the temperature responsive resistance 26. The other terminals of the adjustable potentiometer 86 and the temperature responsive resistance 26 are connected together and their junction is connected by the conductor 88 to the base of the transistor 48.

For providing an anticipating effect in the control circuit to prevent overshooting of temperatures due to stored heat in the surface heater 20, there is provided a low wattage anticipating heater 91 in series with the conductor 66. This heater 91 preferably has a resistance of about $\frac{2}{100}$ of an ohm and is located in heat transfer relationship with a thermistor 92. This thermistor 92 has one terminal connected through the conductor 93 and the resistance 94 to the conductor 88. The other terminal of the thermistor 92 is connected to the conductor 95 to the conductor 84. This therefore connects the thermistor 92 in combination with the resistor 94 in parallel circuit with the potentiometer 86 and the current limiting resistance 85.

As long as the temperature of the temperature responsive resistance 26 is below the value set by the adjustment of the potentiometer 86, there will be applied through the conductor 88 to the base of the transistor 48 a voltage sufficient to cause the transistor 48 to amplify the peak voltage applied to the gate 54 an amount which is adequate to cause the master silicon-controlled rectifier 56 to conduct. This voltage peak will be applied at the beginning of each positive, alternating current, half cycle if the rectifier 56 is oriented to conduct positive half cycles. If the rectifier 56 is oriented to conduct negative half cycles, the peak voltage will be applied to the gate 54 at the beginning of each negative half cycle.

The alternating sine wave as applied from the power source is indicated by the solid and dot-dash line 21 in FIGURE 4. A typical voltage curve 55 applied to the gate 54 which is insufficient to cause firing of the rectifier 56 is illustrated in dotted lines. This particular wave form results from the application of the rectified half wave current through the step-down, step-up transformer system. It should be noted that the peak voltage 51 is at the beginning of each wave and is higher than any of the voltages during the remainder of the wave. This peak wave 51 occurs slightly before the alternating sine wave 21 crosses the zero line. When the voltage applied to the gate 54 is amplified sufficiently to fire the rectifier 56, it takes the form of the voltage curve 57 shown in full lines in FIGURE 4. This voltage curve 57 includes a peak voltage 53 occurring substantially at the time the sine wave 21 crosses the zero point. The presence of the rectifiers in this system prevents the occurrence of negative voltages and partially accounts for the shape and type of waves 55 and 57. In the amplified wave form, the peak voltage 53 is always greater than the voltage for the remainder of the wave. The shape of the wave 57 therefore assures that the firing of the rectifier 56 will occur substantially at the beginning of each wave and that firing will never begin at a later point in the wave. This effectively prevents radio interference.

When the master rectifier 56 conducts for a half cycle through the primary winding 60 and the secondary 64 of the transformer 62, a voltage peak 67 sufficient to cause conduction will be applied at the gate 70 of the slave silicon-controlled rectifier 72 at the beginning of the following half cycle. This conduction of current through the rectifier 56 induces a voltage through the transformer 62 applied to the gate 70 which takes the form of the dash line voltage curve 65 in FIGURE 4. This curve includes a small peak 67 substantially at the time that the sine wave 21 crosses the zero point. This peak 67 is sufficient to cause the slave rectifier 72 to fire or conduct. The voltage curve 65 is only generated when the master rectifier 56 conducts. This wave form 65 will always be substantially the same, therefore, since it results from the complete conduction of the master rectifier 56. It therefore is not necessary that the wave form 65 be similar to the wave forms 57 and 55 since this wave form 65 will always produce conduction of the slave rectifier 72 at the proper time. Since the master-controlled rectifier 56 and the slave-controlled rectifier 72 are arranged in inverse relationship, if the master rectifier 56 conducts for a positive half cycle, this will cause the slave rectifier 72 to conduct for negative half cycles and vice versa. This, therefore, will apply full-wave, alternating current energy to the surface heater 20 as long as the transistor 48 provides sufficient amplification. The voltage curve 71 in FIGURE 4 illustrates the voltage drop across the silicon-controlled rectifiers 56 and 72 as they conduct alternately.

As the temperature of the temperature responsive resistance 26 increases, the voltage applied through the conductor 88 to the base of the transistor 48 will decrease, thereby decreasing the amplification of the transistor 48. As the temperature responsive resistance 26 approaches the temperature corresponding to the setting of the potentiometer 86, the anticipating thermistor 92 will have been heated sufficiently by the heater 91 to modify the effect of the potentiometer 86 and the resistance 85 so as to have an anticipating effect upon the circuit in such a way as to further decrease the signal applied between the base and emitter of the transistor 48 so as to cause the silicon-controlled rectifiers 54 and 72 to stop conducting before the temperature selected by the adjustment of the potentiometer 86 is actually reached.

When this amplification is thereby reduced as illustrated by the voltage curve 55, the voltage peak 51 applied to the gate 54 is so low that it will not keep the master silicon-controlled rectifier 56 conducting. This also will eliminate the voltage pulse applied to the gate 70 to prevent the slave silicon-controlled rectifier 72 from conducting. This non-conducting condition will prevail as long as the temperature responsive resistance 26 is at the selected temperature or above. When or if the temperature responsive resistance 26 should fall below the selected temperature, the voltage applied through the conductor 88 to the base of the transistor 48 will increase to a value sufficient to cause the transistor 48 to amplify the current and the voltage peak applied to the gate 54 sufficiently to cause the master silicon-controlled rectifier 56 to resume conducting. The slave silicon-controlled rectifier 72 will also be caused to conduct as before. Through this arrangement, the heater 20 or any electrical load will be caused to heat or operate in accordance with the temperature of the temperature responsive resistance 26. Other forms of controls may be substituted for the temperature responsive resistance 26, if desired. I find that this control will control the heater 20 so that the temperature will be quickly brought up to the temperature selected and maintained substantially at that temperature as long as desired without any substantial amount of overshooting or radio interference.

In FIGURE 3, there is provided an alternative form of trigger circuit 190 which may be substituted for the components in the trigger circuit enclosed within the dot-and-dash outline 90 in FIGURE 2. In this alternative arrangement, there is provided a primary winding 132 of the transformer 134 which is adapted to have its terminals connected through conductors to the supply conductors $L_1$ and $L_2$ similarly to FIGURE 2. This step-down transformer has a secondary winding 136 with its upper terminal connected by the conductor 138 to the primary winding 140 of the step-up transformer 142. The lower terminal of the secondary winding 136 is connected through the conductor 146 and a diode rectifier 144 to the lower terminal of a positive temperature responsive resistance 126. The other terminal of the temperature responsive resistance is connected through a Shockley type, four layer diode 148 to the second terminal of the primary winding 140. The connection between the temperature responsive resistance 126 and the Shockley type, four layer diode 148 is through a junction 149 connected to a capacitor 151 having its second connection connected to the conductor 138. This alternate trigger circuit represented by the part of the circuit within the dot-and-dash outline 190 may therefore be substituted for the trigger circuit in FIGURE 2 which is enclosed within the dot-and-dash outline 90. This alternate trigger circuit enclosed by the dot-and-dash outline 190 likewise includes the step-down, step-up transformer and rectifier arrangement which applies to the gate 54 a peak voltage at the beginning of each alternate half cycle of similar configuration. The operation of the master, slave circuit arrangement is similar in each case. The temperature responsive resistance 126 controls the application of insufficient or sufficient voltage to the Shockley type, four layer diode 148 to cause it not to conduct or to conduct and apply the peak voltage through the step-up transformer 142 to the gate 54.

Referring now more particularly to the modified form of wiring diagram shown in FIGURE 5, the supply conductor $L_1$ is connected through the conductor 221 to a three-winding transformer 223 having its primary winding 225 connected between the conductors 221 and 227. The conductor 227 connects through the branch conductors 229 and 231 to the oppositely connected, silicon-controlled rectifiers 233 and 235. The conductor 229 connects to the anode of the master rectifier 233 while the conductor 231 connects to the cathode of the slave rectifier 235. The cathode of the rectifier 233 and the anode of the rectifier 235 are connected respectively by the conductors 237 and 239 which join to the conductor 241 providing a connection through the conductor 243 to one terminal of the electrical load 245 which may be a surface heater similar to the surface heater 20 of FIGURE 1. The second terminal of the load 245 connects to the supply conductor $L_2$. However, the load 245 may be some other type.

The control system for the silicon-controlled rectifiers 233 and 235 includes a three-winding, step-down transformer 247 including a primary winding 249 connected between the supply conductor $L_1$ and the neutral conductor N. The first secondary winding 250 connects through the rectifier 253 to the collector of an NPN type of transistor 255. The emitter of this transistor 255 is connected through the conductors 257 and 259 to the primary winding 261 of a step-up transformer 263. The secondary winding 265 of this transformer 263 has one terminal connected to the conductor 243 and its second terminal connected through the rectifier 267, the current limiting resistance 269 and the conductor 271 to the gate of the silicon-controlled rectifier 233. By virtue of this step-down, step-up transformer arrangement, a peak voltage is applied to the gate of the silicon-controlled rectifier 233 at the beginning of each half wave which the rectifier 233 is oriented to conduct.

The conduction of the silicon-controlled rectifier 233 depends on the amplitude of this peak voltage provided by the transistor 255. This amplitude is controlled by a bridge circuit powered by the second secondary winding 273 of the transformer 247 having a center tap connected by the conductor 275 to the base of the transistor 255. The upper terminal of the winding 273 on the wiring diagram is connected through the resistor 277 to an adjustable potentiometer 279 which is provided for temperature selection. The lower terminal on the wiring diagram of the secondary winding 273 is connected through the conductor 281 and a rectifier 283 to one terminal of the thermistor or temperature responsive resistance 285. The other terminals of the potentiometer 279 and the positive temperature responsive resistance 285 are connected through the common conductor 287 and the conductor 289 to the conductor 257 connecting with the emitter of the transistor 255. Through this circuitry, the amplitude of the signal applied to the transistor 255 is effectively controlled.

When this system is used for controlling a heater, it is desirable to provide an anticipating arrangement to prevent overshooting. In this circuit, this is accomplished through the secondary winding 291 which is connected through the conductor 293 and the conductor 295 as well as the rectifier 297 to the opposite terminals of the temperature responsive resistance 285 which is incorporated in the pan contactor similar to 26 in FIGURE 1. The rectifiers 283 and 297 provide the proper directional control of the current so that this control circuit will accomplish its intended function at all times. The polarity of the transformer winding 291 is so oriented and the amplitude of the voltage is sufficient that, during the half cycle in which the transistor 255 can operate, the induced voltage of the transformer winding 291 will apply a positive voltage to the cathode electrode of the diode 297 to prevent current flow through the diode 297. During the following half cycle, the anticipator winding 291 provides current through the diode 297 and power to the combined pan temperature sensing and anticipating temperature responsive resistance 285 which is thereby heated to cause its resistance to increase to provide an anticipating effect. This anticipating effect, however, occurs only when the bridge circuit is unbalanced far enough that rectifiers 233 and 235 are conducting.

The transformer 223 is provided with a second secondary winding 299 which has one terminal connected to the conductor 227 and its second terminal connected through the conductor 300, the rectifier 301 and the resistance 303 as well as the conductor 305 to the gate of the second silicon-controlled rectifier 235. Through this last arrangement, whenever the current is flowing through the load 245 as a result of the firing or conducting of the rectifier 233, the current flowing through the primary winding 225 of the transformer 223 will generate a current in the secondary winding 299 which will apply a sufficient voltage and current to the gate of the silicon-controlled rectifier 235 at the end of the conducting half cycle of the silicon-controlled rectifier 233 that the silicon-controlled rectifier 235 will be caused to conduct at the very beginning and throughout the next half cycle of the alternating current. This accomplishes full wave use and control of the load 245 in a simple and accurate manner.

In the use of this circuit for controlling an electric heater 245, the potentiometer 279 has its adjustment calibrated to provide selected temperature control settings for the temperature responsive resistance 285. When this potentiometer 279 is set to a selected temperature, this will be the resistance of the temperature responsive resistance 285 at approximately the temperature selected. The positive temperature responsive resistance being cold at the start will have a much lower resistance than the potentiometer 275, thereby providing an unbalance in the bridge circuit which is applied to provide a high amplitude of signal to the transistor 255 providing a peak voltage sufficient to cause the rectifier 233 to conduct. The rectifier 233 (being the master rectifier while the rectifier 235 is the slave rectifier) will conduct for the next half cycle while the slave rectifier will conduct for the succeeding half cycle after the rectifier 233 conducts for the previous half cycle. This will continue until the temperature of the temperature responsive resistance 285 and the current generated in the winding 291 cause the bridge circuit to reach substantial balance. This balanced condition will cause the transistor 255 to decrease conduction and therefore the peake voltage applied to the rectifier 233 will be insufficient to cause it to conduct until the temperature of the temperature responsive resistance 285 is lowered sufficiently to increase the conduction of the transistor 255 to again cause the silicon-controlled rectifiers to conduct. The slave rectifier 235 will not again conduct until the master rectifier 233 again conducts.

Figure 6:
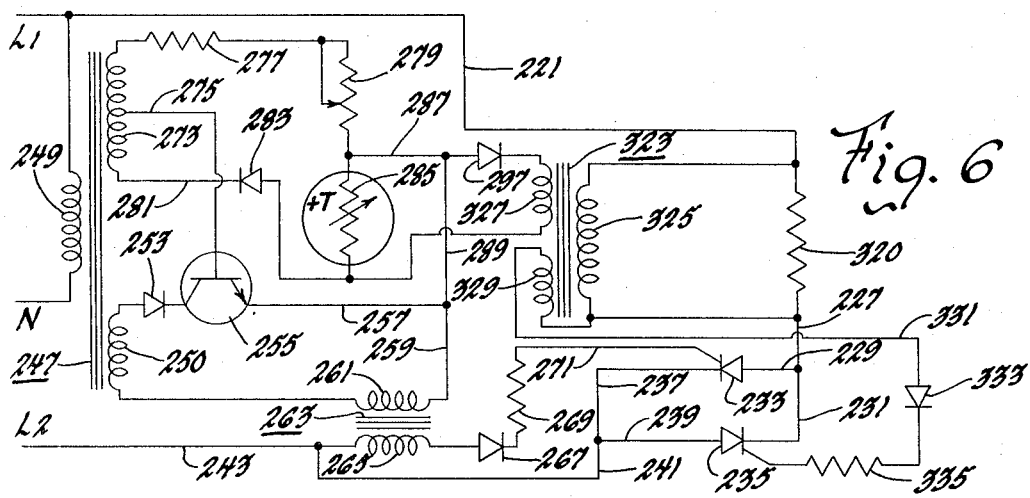
FIGURE 6 is a modified wiring diagram somewhat similar to FIGURE 5 but differing in that the three-winding transformer has its primary winding connected in shunt with the electrical load.

The circuit shown in FIGURE 6 is similar to the circuit shown in FIGURE 5 and similar elements of the circuit bear the same reference characters with the exception of the transformer corresponding to the transformer 223 in FIGURE 5. In FIGURE 6, the electrical load, such as the electrical heater 320, has its terminals connected to the conductors 221 and 227 in series with the parallel connected master and slave rectifiers 233 and 235. The three-winding transformer 323 which corresponds to the transformer 223 has its primary winding 325 connected in shunt with the load 320. It has one secondary winding 327 corresponding to the secondary winding 291 which in a similar manner applies an anticipating current to the temperature responsive resistance 285. It also has a second secondary winding 329 corresponding to the winding 299 which controls the slave rectifier 235 through the conductor 331, the rectifier 333 and the current limiting resistance 335. This circuit operates in a similar manner to the circuit in FIGURE 5 with the exception that the resistance of the primary winding 325 does not affect the current flow in the heater 320. Thus, the resistance of the heater 320 for maximum output need not take such resistance into consideration and thereby the heater may be of standard specifications.

Figure 7:
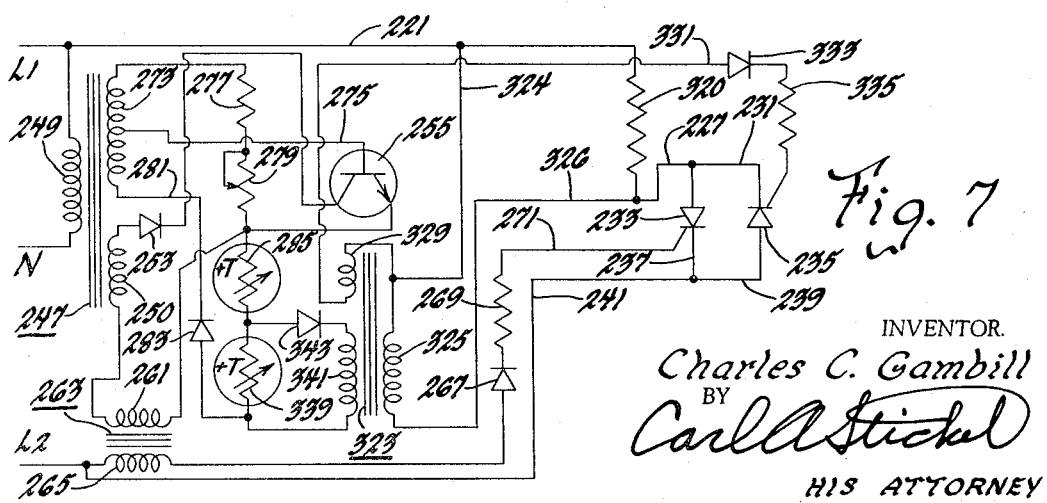
FIGURE 7 is a modified wiring diagram similar to FIGURE 6 but differing in that the third winding of the transformer is connected in parallel with a factory calibration adjustment which is in series with the temperature responsive resistance.

The wiring diagram shown in FIGURE 7 is similar to that shown in FIGURE 6 and similar parts bear the same reference characters. The difference between FIGURE 7 and FIGURE 6 is that a positive temperature responsive resistance 339 is connected in series with the temperature responsive resistance 285 and specifically between the temperature responsive resistance 285 and the diode 283. The resistances 339 and 285 have similar characteristics. Secondly, the anticipator secondary winding 341, instead of being connected to the terminals of the temperature responsive resistance 285, is connected across the terminals of the temperature responsive resistance 339. A diode 343 is placed in this anticipating circuit. The polarity of the transformer winding 341 is so oriented and the amplitude of the voltage is sufficient that, during the half cycle in which the transistor 255 can operate, the induced voltage of the transformer winding 341 will apply a positive voltage to the cathode electrode of the diode 343 to prevent current flow through the diode 343. During the following half cycle, the anticipator winding 341 provides current through the diode 343 and power to the temperature responsive resistance 339 which is thereby heated to cause its resistance to increase to add to the resistance of the temperature responsive sensing resistance 285 to provide an anticipating effect. This anticipating effect, however, occurs only when the bridge circuit is unbalanced far enough that the silicon-controlled rectifiers 233 and 235 are conducting. This wiring diagram shown in FIGURE 7 operates similarly to the wiring diagram shown in FIGURE 6. The only exception is that the anticipating current provided by the winding 341 is applied on opposite sides of the temperature responsive resistance 339 which is in series with the temperature responsive pan sensing resistance 285.

The wiring diagram for FIGURE 8 is similar to that for FIGURE 5 and corresponding parts bear the same reference characters. This wiring diagram differs from FIGURE 5 in that it provides an improved anticipator arrangement which includes a dual thermistor having an inherent lag between the heat input on one side or one circuit portion of the thermistor and the temperature effect on the other side or remaining circuit portion of the thermistor. This minimizes the overshoot for various heating loads. In FIGURE 8, the transformer 223 is provided with a second secondary transformer winding 351 which has its terminals connected through the conductors 353 and 355 to the common terminal 371 of the dual thermistor 357 having a negative temperature coefficient in the circuit portion 363. This dual thermistor 357 has one circuit 359 provided with a terminal 373 connecting through the conductor 361 with the other terminal of the secondary winding 351 of the transformer 223. The second cricuit 363 of the dual thermistor 357 is connected in series with the fixed resistance 367 across the fixed resistance 277 and the customer adjusted resistance or potentiometer 279. This is accomplished through the connection of the common terminal 371 through the conductors 355, 293 and 287 with the conductor connecting the adjustable potentiometer 279 with the temperature responsive resistance 285. The third terminal 375 of the dual thermistor 357 is connected through the conductor 365, the fixed resistance 367 and the conductor 369 to the upper terminal of the secondary winding 273 of the transformer 247. This dual thermistor 357 has a terminal (373, 375) at each end of the semiconductor material and a terminal (371) at the center or intermediate point of the semiconductor material. The semiconductor material for this dual thermistor is of the type commonly used for thermistors. The remaining details of operation are similar to those of FIGURES 5 to 7.

In FIGURE 9, there is shown a wiring diagram in which the dual thermistor anticipating arrangement is applied to a circuit partly similar to that illustrated in FIGURE 7. Parts of the wiring diagram illustrated in FIGURE 9 corresponding to the parts in FIGURES 7 and 8 are given the same reference character and function in substantially the same way. The transformer 323 has its second secondary winding 420 (which roughly corresponds to the wiring 341 in FIGURE 7) connected through the conductor 430 to the second circuit 428 of the dual thermistor 424. This circuit is completed by the connection from the common terminal of the thermistor 424 through the conductor 422 to the second terminal of the second secondary winding 420. The first circuit 426 of the thermistor 424 is connected to the connection between the temperature responsive resistance 285 and the adjustable temperature selecting potentiometer or resistance 279. In this circuit illustrated in FIGURE 9, the second secondary winding 420 produces a voltage which sends a small current through the circuit 428 of the thermistor 424. The resistance of both circuits 426 and 428 is high when they are cold as is the condition under initial energization of the circuit. The voltage provided by the second secondary winding 420 is selected so that it will slowly bring the thermistor 424 up to a higher temperature and lower resistance. When this temperature is reached by the thermistor 424, current flows much more readily through both its circuit portions 426 and 428. This has the effect of substantially balancing the bridge circuit so as to bring the base-emitter voltage upon the transistor 255 so low as to prevent any substantial conduction by this transistor 255. This will stop the rectifiers 233 and 235 from conducting to prevent overshooting of the selected temperature. The sharp reduction in resistance by the thermistor quickly stops the conductance at the proper time. This assures maximum heating speed with a minimum of overshoot of the temperature selected.

The remaining details of operation are similar to those of FIGURES 5 to 7.

While the embodiments of the present invention, as herein disclosed, constitute preferred forms, it is to be understood that other forms might be adopted.

What is claimed is as follows:

1. In combination, an electrical load, alternating current supply means electrically connected to said load, a first silicon controlled rectifier having an anode electrode and a cathode electrode connected in series with said load and having a gate, a second silicon controlled rectifier having an anode and a cathode electrode connected in parallel circuit with said first rectifier and in series with said load and having a gate, one of said rectifiers having its anode electrode connected to said load and the other of said rectifiers having its cathode electrode connected to said load, means for applying a peak voltage to the gate of one of said rectifiers, means for increasing and decreasing said peak voltage to cause the one rectifier having the gate to which the peak voltage is applied to conduct or not to conduct, a preponderantly inductive circuit portion comprising a transformer having an input winding connected in series with the electrodes of one of said rectifiers and having an output winding, and a diode rectifier connected in series with said output winding between the gate and one of the electrodes of the other silicon controlled rectifier to cause said other silicon controlled rectifier to conduct or not to conduct for substantially complete half cycles alternatively relative to said one silicon controlled rectifier.

2. In combination, an electrical heat dissipating load, an alternating current energy supply electrically connected to supply energy to said load, a voltage responsive semiconductor control means having electrodes connected in series with said load for controlling the supply of energy from said supply to said load, preponderantly inductive circuit means for repeatedly applying to said control means a voltage peak substantially at the time in the application of the alternating voltage sine wave to said control means when the voltage passes through zero comprising a first transformer having input terminal means connected to said energy supply and output terminal means, a second transformer having input and output terminal means, means comprising first conductor means and a current control means and a rectifier connecting the output terminal means of said first transformer with the input terminal means of said second transformer, and second conductor means connecting the output terminal means of said second transformer with two electrodes of said semi-conductor control means for controlling the energy supply to said load in substantially complete half cycles in response to said current control means, a third transformer having an input winding connected in series with the electrodes of said semi-conductor control means, a silicon controlled rectifier having an anode electrode and a cathode electrode connected in parallel circuit with said semi-conductor control means and having a gate, said third transformer having an output winding, preponderantly inductive circuit portion comprising a diode rectifier and conductor means connected in series with said output winding of said third transformer between said gate and one of said electrodes of said silicon controlled rectifier.

3. A combination as defined in claim 1 in which said transformer is provided with a second output winding and means responsive to the energization of said second winding for varying said means for increasing or decreasing said peak voltage.

4. A combination as defined in claim 2 in which said third transformer is provided with a second output winding and means responsive to the energization of said second output winding for varying said current control means.

5. In combination, an electrical load, alternating current supply means electrically connected to said electrical load, a semi-conductor control means having electrodes connected in series with said electrical load, preponderantly inductive circuit means between said supply means and one of the electrodes of said control means for repeatedly applying to said one electrode a peak voltage substantially at the time in the application of the alternating current sine wave to the control means when the voltage passes through zero comprising a first transformer having input terminal means electrically connected to said supply means and having output terminal means, a control circuit, a second transformer having input terminal means and having output terminal means connected to said one electrode and said supply means for controlling said semi-conductor control means, said control circuit connecting output terminal means of said first transformer and input terminal means of said second transformer and provided with a control bridge comprising a current control device and a dual thermistor having terminals connected to said bridge and means for applying energy to said dual thermistor in response to the energization of said load.

References Cited by the Examiner
UNITED STATES PATENTS

| | | | |
|---|---|---|---|
| 3,051,813 | 8/1962 | Busch et al. | 219—489 |
| 3,175,076 | 3/1965 | Fox et al. | 219—494 |
| 3,175,077 | 3/1965 | Fox et al. | 219—494 |
| 3,196,255 | 7/1965 | Beauchamp et al. | 219—497 |
| 3,204,113 | 8/1965 | Snygg | 323—22 X |

JOHN F. COUCH, *Primary Examiner.*

W. E. RAY, *Assistant Examiner.*